FIG. 1a

- 38 — COVER LAYER OF SBR RUBBER.
- 37 — TEXTILE BREAKER BRAID.
- 36 — COVER LAYER OF SBR RUBBER
- 31 — 3rd WIRE BRAID
- 30 — LAYER OF POLYCHLOROPRENE
- 28 — 2nd WIRE BRAID
- 27 — LAYER OF POLYCHLOROPRENE
- 26 — 1st WIRE BRAID
- 25 — LAYER OF POLYCHLOROPRENE
- 23 — FILLER OF POLYCHLOROPRENE
- 24 — ROUND WIRE
- 22, 21 — 2 PLIES CLOSELY WOVEN NYLON FABRIC
- 16 — TUBE OF POLYCHLOROPRENE
- 15 — SPIRAL OF NYLON RIBBON WRAPPING
- 14, 13 — 2 PLIES NYLON CLOSELY WOVEN FABRIC
- 12 — LAYER OF POLYCHLOROPRENE
- 11 — FLAT BORE WIRE

FIG. 5a

- 108 — COVER LAYER OF SBR RUBBER
- 102 — TEXTILE BREAKER BRAID
- 101 — COVER LAYER OF SBR RUBBER
- 97 — 4th WIRE BRAID
- 98 — LAYER OF POLYCHLOROPRENE
- 97 — 3rd WIRE BRAID
- 98 — LAYER OF POLYCHLOROPRENE
- 97 — 2nd WIRE BRAID
- 98 — LAYER OF POLYCHLOROPRENE
- 97 — 1st WIRE BRAID
- 94 — TUBE OF POLYCHLOROPRENE
- 93 — 2 PLIES OF CLOSELY WOVEN NYLON FABRIC
- 92 — LAYER OF POLYCHLOROPRENE
- 91 — FLEXIBLE METAL TUBE

INVENTORS
CLAYTON H. SKINNER
PAUL J. SICK
BY Burgess, Ryan - Hicks
ATTORNEYS

3,420,276
GAS PERMEABLE FLEXIBLE HOSE
Clayton H. Skinner, Kenmore, and Paul J. Sick, Buffalo, N.Y., assignors to Hewitt-Robins Incorporated, Stamford, Conn.
Filed July 22, 1965, Ser. No. 473,952
U.S. Cl. 138—127                     14 Claims
Int. Cl. F16l 11/08

ABSTRACT OF THE DISCLOSURE

The invention is directed to a flexible hose, useful, for example, for the transportation of liquids, which are easily volatile, and which are under pressure while being transported to maintain them in liquid state. The hose comprises a plurality of concentric annular sections in embracing relationship made up of reinforcing superposed annular layers of elastomeric material consolidated into a unit. The hose is gas permeable and its different annular sections are constructed so as to increase in permeability progressively from section to section radially outwardly.

---

The present invention relates to a flexible hose and coupling therefor.

In the transportation of liquids which are easily volatile and which are under pressure while being transported to maintain them in liquid state, such as liquified petroleum gas, anhydrous ammonia and similar gaseous materials, it is customary to use a fabricated flexible hose made of elastomeric material reinforced by textile and/or wire. There are no practical and presently available materials, which are absolutely impermeable to this type of liquid-gas, and which permit the manufacture of flexible hose therefrom. It is, therefore, necessary to use materials which happen to be permeable to this liquid-gas.

Flexible hose for transporting such liquid-gas material permits the liquid under internal pressure to diffuse outwardly of the hose through the carcass of the hose. As this diffusing liquid approaches the cover of the hose, it is no longer held under great pressure, and becomes a gas, which expands and thus creates blisters in the carcass under the cover of the hose. These blisters burst and thereby produce weakened areas in the regions of the bursts. These regions are susceptible to early failure, either by actually rupturing the wall of the hose or by permitting the elements surrounding the hose to enter the ruptured cover and attack the reinforcement in the hose.

If the cover of the hose is pricked with fine needles to avoid the conditions described, the perforations produced permit the fluid in gaseous state to escape. However, it is not safe to rely solely upon these fine perforations, since they become easily plugged with dirt or the gummy elastomeric cover flows together, closing the perforations so that the same problem of cover blisters occurs again.

It is sometimes required to transport gaseous materials through hose submerged under water of varying depths, so that the hose is subjected to varying external pressures depending upon the contour of the bottom of the water in which the hose is laid. Under these conditions, the hose will be subjected to very high internal gas pressures while under extreme external water pressure. In such application, limited permeation of liquid and/or diffusion of gas through the membrane of the hose occurs, so that liquid or gas may be stored in pockets formed within the wall of the tube. Should the external pressure become less than the internal pressure, the cover would blow off in these pocket areas, exposing the carcass of the hose to the action of the water. This water may be particularly destructive if it is sea water.

One object of the present invention is to provide a new and improved hose construction which avoids the drawbacks of the prior art described.

In carrying out this feature of the present invention, the hose is so designed that the degree of permeability from the inside bore of the hose outwardly is graduated, by decreasing the impermeability and increasing the permeability of the hose as the outer periphery of the hose wall or cover is approached.

With this construction, any gas that passes through the tube into the carcass of the tube will not be retained in the carcass, but will be dissipated by permeating through the cover.

Pricking of the cover may be advantageously employed to release the gases entrapped in the cover. However, such pricking in the case of a hose for submarine use would cause the water to penetrate the cover down to the carcass, thereby causing said carcass to be exposed to the destructive action of the water, especially if it is sea water.

Another object of the present invention is to provide a new and improved hose which is so constructed and so pricked as to avoid the disadvantages described.

In carrying out the foregoing objective, a strong breaker fabric of nylon, stainless steel or similar material in the hose, is floated in the cover in such a manner that only part of the cover, desirably approximately one-half, is over the breaker. The cover is pricked at a predetermined depth down to the breaker, leaving the interior part of the cover unpricked. In this manner, the gases which permeate the hose carcass and gather in pockets under the inner cover part will not blow the inner cover part because the strong breaker which is resistant to sea water will hold the inner cover part. The gas which then blows through the interstices of the breaker will be permitted to escape the outer cover part through the pricked holes in said outer cover part, thereby blowing out any sea water or other water which might have entered the pricked holes as far as the breaker. Thus, by this novel placement of the breaker in combination with the pricking, the pocketing effect of the permeated and accumulated gases is overcome with the outer cover part remaining intact.

Prior art hose employed for submarine use to convey gaseous material such as oil and gasoline are conventionally a smooth bore ribbon tube with fabric and wire reinforcements to create either a hard wall to resist the external forces to which the hose is subjected or a mere flexible hose which will withstand for a short period of time semi-collapse, when the internal pressure is lowered sufficiently. This submarine hose is quite heavy, is somewhat stiff and inflexible due to its extremely heavy carcass, and is quite expensive. Moreover, this hose cannot be manufactured in long lengths and, therefore, is normally made in lengths of about 25 to 30 feet. This hose conventionally has built-in fittings, for coupling, which add to this weight, and where long lengths of hose are required, as for example, about 1000 feet long, it would be impossible to handle the heavy construction this would involve with fittings every 25 to 30 feet, and would be very expensive.

Certain applications now arise requiring transportation of gaseous materials through long lengths of hose under high internal pressure and at the same time submergence of the hose in water of varying depths, so that the hose is subject to varying external pressure depending on the surface contour of the bottom of water in which it is laid. In such a pipe line, various difficult problems are posed as follows:

(1) The hose must be able to resist high internal pressures ranging from 1000 p.s.i. to 3000 p.s.i.

(2) The hose must be able to withstand high external pressures when pressurized internally, as for example, such external pressure as are created at a depth of 1000 feet, which approximate 500 p.s.i.

(3) The hose must be able to withstand high external pressures with zero internal pressure.

(4) The hose must be highly resistant to elongation.

(5) The hose must be resistant to cover wear under water.

(6) The hose must be resistant to torsion and rolling with the water movement.

(7) The hose must have negative buoyancy empty or filled with product so that it can be submerged out of the path of ships.

(8) The hose must be capable of being easily handled in long lengths after manufacture, i.e. light enough in weight so that 1000 feet lengths can be reeled for shipping; sufficiently small in outside diameter that normal lanes can handle the size of the unit; sufficiently resistant to kinking that the hose can be reeled off for laying in its application area.

(9) The hose must be sufficiently economical to permit its use for the type of transportation described.

(10) The hose must be so constructed as to permit it to be manufactured in a practical way.

(11) The hose must be equipped with quick connect couplings, which will permit the easy assembly in the field of lengths of 1000 feet into infinite lengths.

Another object of the present invention is to provide a new and improved hose, and a coupling therefor which will meet the submarine requirements described.

To meet one of the objectives of the present invention, the hose has been constructed to prevent collapse under high external pressure when the internal pressure has been reduced to zero. In designing the hose for this purpose, certain factors have been considered.

In a hose serving the purpose described, some gas will diffuse into the hose wall until a saturation point is reached. Internal pressures can be equalized or minimided by sufficient external pressure and the hose design would, under some circumstances, require less components for resisting external pressure if constancy in internal pressure could be assured. The gas which has been diffused into the carcass while under these internal and external pressures remains compressed. However, should the internal pressure, due to some accident or necessity be reduced to zero or lowered substantially, these gases within the hose wall would be released from compression and would expand, blowing the tube and perhaps the carcass back down into the bore as a result of the expansion of the gas in the carcass. As a feature of the present invention, new and improved means have been provided to support the inner portion of the hose against this blowback, while affording high resistance against elongation and while permitting high elongation without rupture or destructive action on the hose. For that purpose, the hose is provided in one embodiment with a spiral bore wire and embedded in the carcass of the hose is a reinforcement for said carcass desirably in the form of one or more layers of wire braid providing a hard or semi-hard wall to resist external forces. Also embedded in the carcass on the radially inner side of the wire braid is a round spiral wire located over the spaces between successive convolutions of the bore wire and acting to support the column defined by the wire braids against collapse under end pull during laying operation or other usage, and thus to limit elongation of the hose. The round wire located with respect to the wire braid as described, acts to further hold the braid outwardly when subjected to end pull. Multiple reinforcing wire braids may be used and textile braids may be employed in conjunction therewith or in place thereof.

The hose construction described, covers all of the requirements indicated above except that of long length. Inasmuch as this hose must be built on a mandrel, it is limited to the conventional vulcanized length. The mandrel is required to form the bore wire and to support the inner portion of the hose during building as well as to provide the necessary pressure member by which carcass consolidation during building and cure is effected.

An object of the present invention in connection with the bore wire form of hose is to provide new and improved internal means for coupling the shorter lengths of hose described made on a mandrel, as for example, lengths of 50 to 60 feet, to longer lengths, as for example, 300 feet.

Another object of the present invention in connection with the bore wire form of hose, is to provide new and improved means for quickly coupling the internally coupled lengths of hose, as for example, the lengths of 300 feet, into still longer lengths, as for example, into lengths of 1000 feet or more.

In the hose construction described having a bore wire, a separable mandrel is required in its manufacture, thereby limiting the lengths of the individual sections that can be built.

An object of the present invention in connection with another form of hose, is to provide new and improved hose construction, which permits its economical manufacture into longer individual sections than is permitted by hose of the wire bore typed described, and which is flexible and free from stiff joints that might subject the hose to undue stress, thereby permitting it to be easily reeled and handled in lengths, for example, of 1000 feet or over.

For carrying out the foregoing objectives, the hose, instead of having the bore wire described in connection with one form of the present invention, has a flexible metal bore tube, which although constituting a mandrel on which the hose is built in the manufacture of the hose, forms an integral part of the hose. This flexible metal bore tube does not depart from the basic hose design described, so that the hose in which this tube is incorporated can have the specialized features described for submarine or overland transportation of materials. This flexible bore tube is firm enough to permit the hose to be built thereon, is flexible enough to form an integral part of the hose without materially affecting its flexibility, and is designed and constructed to withstand the heat of vulcanization of the hose itself and withstand the external pressures involved. The structure described can not only be employed for transportation of gaseous liquids under water, but in conjunction with a more simplified superstructure described, can be effectively used for blowing such items as grain, dust and other similar materials in low pressure applications.

The flexible bore tube not only serves the function of a mandrel during manufacture as described, but also, when properly designed, provides the hose with the necessary crush resistant member, thus eliminating the round wire described and at the same time providing the bore-supporting structure performing all the functions of the bore wire described.

The flexible bore tube is desirably a flexible tube made of stainless steel or other suitable material made through the interlocking of successive convolutions of the helixes of ribbons of steel by a winding and swaging or pressing operation, and the interlock is such as to be slightly pervious, permitting thereby permeation of gas therewith, and a hose construction with progressive increase in permeability through the hose as the cover of the hose is approached, as in the case of the bore wire hose. Thus, the hose with a flexible bore tube can be manufactured in long lengths and cured in standard curing vulcanizers to create a hose which meets the requirements listed above.

Another object of the present invention is to provide a new and improved coupling, especially useful in connection with hose lengths of the flexible tube bore type described.

Various other objects, features and advantages of the present invention are apparent from the following description and from the accompanying drawings, in which.

Figure 1:
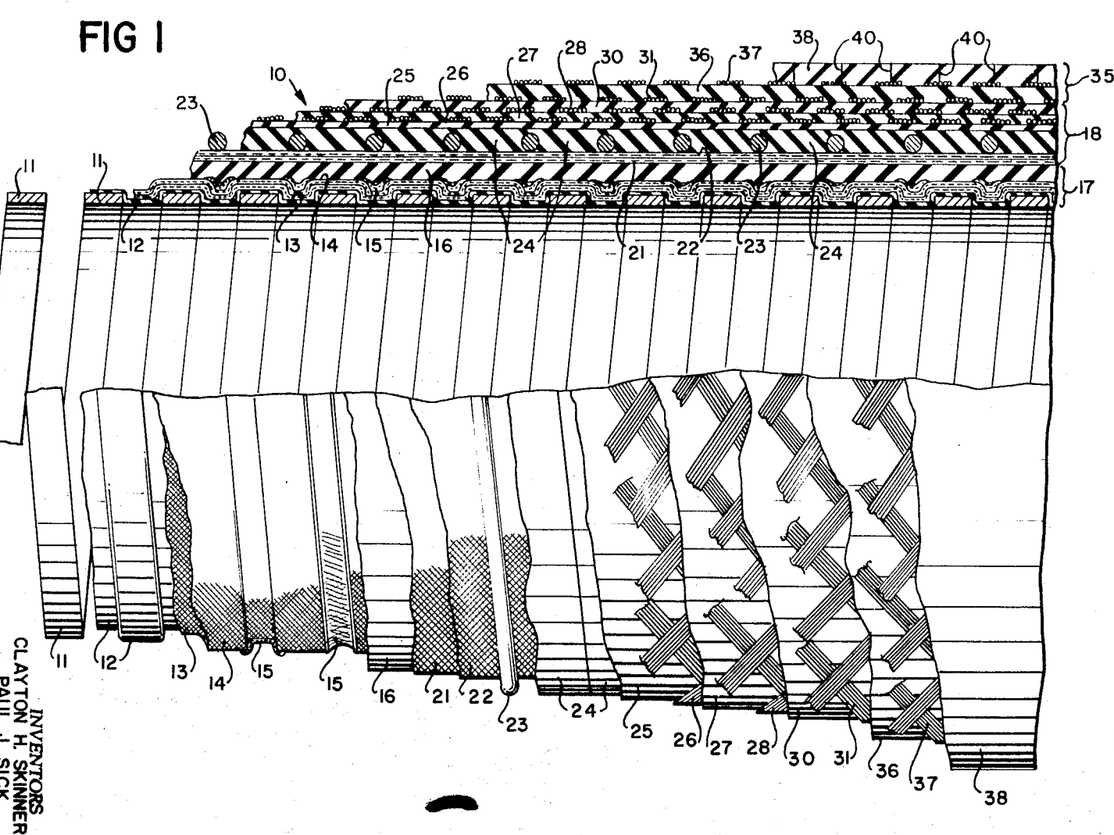
FIG. 1 is a view partly in radial section and partly in side elevation of a portion of a hose of the bore wire type embodying the present invention.
Figure 1A:
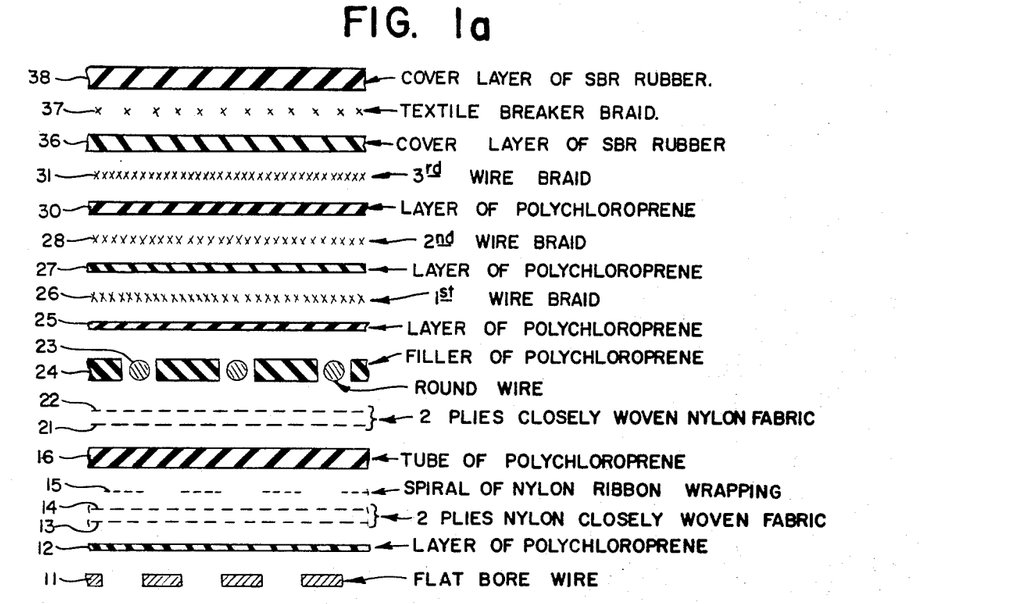
FIG. 1a is a simplified diagram showing schematically the manner and order in which the different components of the hose shown in FIG. 1 are laid in its manufacture.

Referring to FIGS. 1 and 1a of the drawings, there is shown a hose 10, which in the specific embodiment of the invention, may be made in lengths of about 50 to 60′ and have a bore diameter of about 4″. The hose 10 has a flexible metal peripheral bore support 11 shown in the form of a flat spirally wound bore wire, which in the specific embodiment illustrated, may be 3/8″ x 1/8″ and which may be pitched to provide a space of 3/8″ between successive convolutions. This bore wire 11, in the process of manufacturing the hose 10, is spirally wound around a mandrel having a diameter corresponding to the desired internal diameter of the hose. Wrapped around the bore wire 11 is a layer 12 of elastomeric material, preferably polychloroprene, and over this layer are two plies 13 and 14 of closely woven nylon fabric, each rubber frictioned on both sides and cut on a bias. These nylon fabric plies 13 and 14 are held firmly in position by a nylon fabric ribbon 15 spirally and tightly rope-wrapped around these fabric plies, to cause the layer 12 to conformably hug the bore wire 11. Over the ribbon-wrapped nylon fabric plies 13 and 14 is the tube 16 of elastomeric material, preferably polychloroprene.

The bore wire 11 enables the hose 10 to handle very severe materials, such as hot materials, as for example, hot asphalt, or very destructive materials, such as benzene, which normally attacks rubber. With the wire 11, when heat or solvent action penetrates through the inner tube of the hose, causing it to swell, the wire and the fabric plies 13 and 14 retain and support the tender swollen tube, keeping it from collapsing into the bore of the hose.

The bore wire 11 also supports the inner portion of the hose against blowbacks. Such blowbacks result when the internal pressure in the hose has been reduced by accident or necessity to zero or lowered substantially to the point where gases, which have diffused into the hose wall are released from compression and are expanded, thereby tending to blow the tube and perhaps the carcass into the bore.

The construction so far described forms the so-called tube 17 of the hose 10. To form the carcass 18 of the hose 10, there is wrapped over the rubber tube 16 two plies 21 and 22 of closely woven nylon fabric rubber frictioned on both sides. To resist external pressure on the hose 10, there is spirally wrapped around the fabric plies 21 and 22 a round wire 23, which in the specific embodiment of the invention illustrtaed, may be 5/16″ gage, and which is arranged and pitched, so that its convolutions will be located opposite the spaces between the convolutions of the bore wire 11. Between the convolutions of the round wire 23 are fillers 24 of elastomeric material, preferably polychloroprene, which in the later process of curing, will become fused together into a unitary continuous body in which the round wire is firmly embedded. Over the fillers 24 is a layer 25 of elastomeric material, preferably polychloroprene.

To reinforce the carcass 18 of the hose 10, there is over the round wire 23 and over the elastomeric layer 25, a first reinforcing wire braid 26, which is cemented in place, and which in the specific embodiment of the invention referred to, could consist of 0.18″ wire applied at the locking braid angle of 54° 50′ standard. Over this first wire braid 26 is a layer 27 of elastomeric material, desirably polychloroprene. Over this elastomeric layer 27 is a second wire braid 28 similar to the braid 26 and similarly cemented in place. Encompassing this second wire braid 28 is a layer 30 of elastomeric material, desirably polychloroprene, and around this layer of elastomeric material is a third wire braid 31 similar to the other two wire braids 26 and 28 and similarly cemented in place to complete the carcass 18 of the hose 10.

In the construction so far described, the round wire 23 in the carcass 18, not only resists external pressure on the hose, but also supports the column made by the wire braids 26, 28 and 31, and thereby keeps these from collapsing under end pull during laying operation or other handling, and thus assists in limiting elongation of the hose. The positioning of the round wire 23 in the manner described acts to further hold the wire braids 26, 28 and 31 outwardly when subjected to end pull.

In conjunction with the wire braids 26, 28 and 31, textile braids may be used, or textile braids may be used in place of the wire braid, depending upon the pressure requirements.

Over the carcass 18 described is a cover 35 of the hose 10, comprising a layer 36 of suitable rubber, such as SBR rubber (styrene-butadiene), a textile breaker braid 37 of nylon over said layer 36 and an outside layer 38 of suitable rubber, such as SBR rubber.

As indicated above, in handling gaseous materials, two problems exist: One is the permeation of the gas through the hose; and the other problem is diffusion of the gas into the hose so that the gas is stored within the wall. Since there is no practical material available which is impermeable or into which gas cannot be diffused, the hose 10 has been designed to permit a moderate amount of permeation, resistance to permeation being progressively decreased from the bore outwardly from hose section to hose section. Those elastomeric materials for the stock of the hose have been utilized which are resistant to the deleterious effect of the gaseous materials, such as polychloroprene and SBR rubber compound; and these materials are designed to control the rate of permeation so that the carcass and cover stocks have a much higher permeation rate than the tube stock. Thus, any gas that passes through the tube 17 into the carcass 18 will not be retained in the carcas but will be dissipated by permeating through the cover 35. In this manner, if there is a failure in the internal pressure of the hose 10, there would be no pockets of gas entrapped in the carcass 18 to cause a blowdown or blistering.

The tube 17 of the hose 10, with its polychloroprene layer 12 and tightly wrapped plies 13 and 14 of closely woven friction fabric overlaid with the polychloroprene layer 16 offers substantial resistance to permeation of gas. The carcas 18, with its wire braids 26, 28 and 31 and the different polychloroprene layers 25, 27 and 30 offers less resistance to permeation. And the cover 35, with the SBR rubber layers 36 and 38 and its textile breaker braid 37, offers the least resistance to permeation.

The cover rubber layers 36 and 38 are substantially of the same thickness, and although shown in FIG. 1 as separate layers, when cured, will fuse to form one continuous layer with the textile breaker braid 37 embedded therein about midway between the inner and outer peripheries of said continuous layers, so that approximately half the cover 35 is under the breaker braid and half is over the braid. The cover 35, after curing, is pricked with a fine piercing tool, such as needles on a roller or rollers, through the outer rubber part 38 of the cover down to the breaker braid 37 to form punctures 40 therein, leaving the inner rubber part 36 of the cover unpricked. In this manner, the gases which permeate the hose carcass 18 and gather in pockets under the inner cover part 36 will not blow this inner cover part, because the stronger breaker braid 37, which is made of nylon or could be made of stainles steel is resistant to seat water and will hold this inner cover part intact. The gas which permeates through this inner cover part 36 blows through the interstices of the breaker braid 37 and will be permitted to escape through the punctures 40 in the outer part 38, thereby blowing out any sea water which might have entered the punctures as far as the breaker braid. Thus by this novel placement of the breaker braid 37 in combination with the puncturing, the pocketing effect of the permeated and accumulated gases is overcome with the cover 35 remaining intact.

Since the hose 10 of FIGS. 1 and 1a requires the use of a mandrel in its manufacture, it is limited in individual lengths to the conventional vulcanizer length, which may be 50 to 60 feet. The mandrel is required to form the bore wire 11 and to support the inner portion of the hose 10 during building as well as to provide the inner pressure member for the consolidation of the components of the hose during its building and curing. Steam is introduced into the mandrel during cure.

Figure 2:
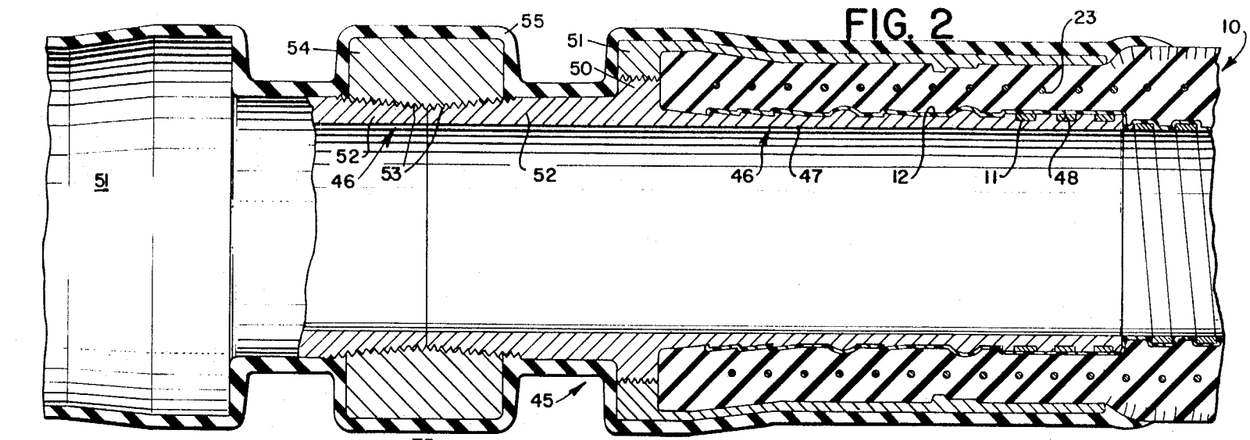
FIG. 2 is a radial section of the coupling which is employed for connecting the individual lengths of hose of the bore wire type shown in FIG. 1, and which constitutes one embodiment of the present invention.

FIG. 2 shows a form of coupling 45, which embodies one aspect of the present invention, and which connects the individual units of 50 to 60 feet hose lengths together. This coupling 45 combines the built-in feature of standard oil suction and discharge or submarine hose fittings with the positive action of the swaged fitting, assuring the end pull requirements of the hose of the present invention.

The coupling 45 consists of two similar fittings 46, each comprising a tubular shank 47 having a spiral slot 48 at its outer end for snugly receiving a few turns of the bore wire 11, so that the shank is built into the hose 10, and having an irregular outer surface inwardly beyond these slots for promoting the adherence of the hose thereto. The end of the hose 10 embraces the shank 47. For the sake of simplicity, this hose 10, aside from the bore wire 11, the rubber layer 12 thereover, and the round wire 23, is shown of solid rubber construction without the other components of the hose described. However, it must be understood that this hose 10 is similar to the construction shown in FIGS. 1 and 1a, and is built over and beyond the shank 47 by successive applications of the different components of the hose described above.

The shank 47 has a peripheral threaded flange 50 and a ferrule 51 is screwed onto this flange and over the end of the hose 10 after the hose has been built over the shank. Swaging is applied to the ferrule 51 and the shank 47 to assure tight gripping of the hose.

Beyond the flange 50 of the fitting 46 is a tubular extension 52 forming the male member of the fitting and having an external thread 53 at its end. Two fittings 46 with attached hose 10 as described, are joined with their male extensions 52 end to end by means of a collar 54 threaded on the threaded ends 53 of these male extensions to form the combined intermediate coupling 45. This coupling 45 is then covered with rubber 55 for submarine use.

A number of hose sections of about 50 to 60 feet long are joined together by the built-in-coupling 45 described in a plant to form hose sections approximately 300 feet long. As another features of the present invention, a new and improved quick connect coupling 60 shown in FIGS. 3 and 4 is provided for use in the field, to assemble these approximately 300 feet hose lengths into approximately 1000 feet hose units.

Figure 3:
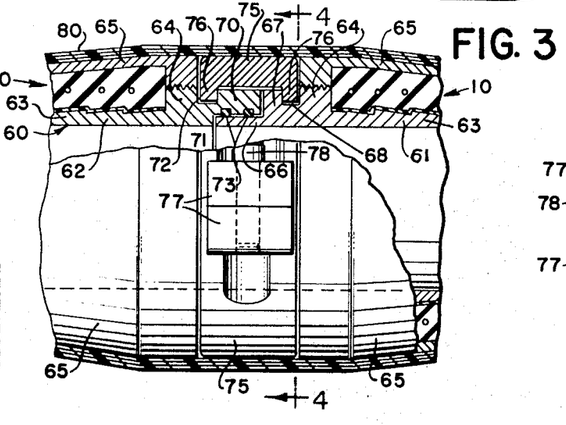
FIG. 3 is a radial section of a quick connect coupling for the longer hose sections made by coupling the individual lengths in the manner, for example, shown in FIG. 2, said quick connect coupling constituting another embodiment of the present invention.
Figure 4:
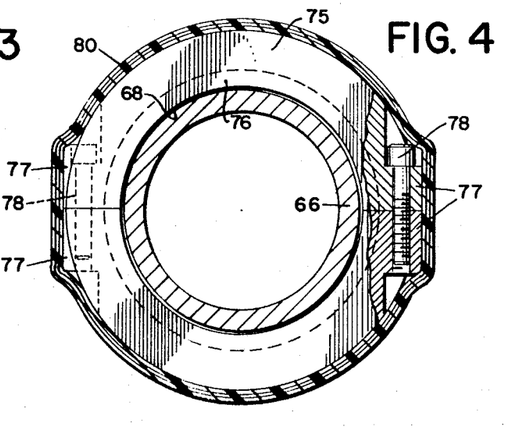
FIG. 4 is a transverse section of the quick connect coupling taken on lines 4—4 of FIG. 3.

The coupling 60 comprises two fittings 61 and 62 having respective tubular shanks 63 similar to the shank 47 in the fittings 46 of FIGS. 2 and 3 and similarly embraced by the ends of the hose 10. Each shank 63 has spiral slots (not shown) similar to the slots 48 in the construction of FIG. 2 to receive a few turns of the bore wire 11 of the hose, and has a threaded peripheral flange 64 and a ferrule 65 similar to the ferrule 51 in the construction of FIG. 2 and similarly screwed onto said flange 64. Swaging is applied to the ferrule 65 and the shank 63 to assure tight gripping of the hose 10.

The fitting 61 has an inward male extension 66 with a peripheral flange 67 spaced from the shank flange 64 to form between said flanges an annular recess 68. The fitting 62 has an inward tubular female extension 70 beyond its flange 64 with an internal annular recess 71 to receive the male extension 66. This female extension 70 has an outside diameter coextensive with the outside diameter of the flange 67 of the fitting 61, so that the outer surface of the female extension 70 and the outer surface of the flange 67 are cylindrically coextensive. The female extension 70 also has an annular recess 72 on the inner side of the peripheral flange 64 of the fitting 62. Between the male extension 66 and the female extension 70 are O-rings 73 of suitable rubber to positively seal the stepped juncture between the two fittings 61 and 62.

The hose ends are built at the plants on the fittings 61 and 62 in the manner described in connection with the intermediate internal coupling 45, except for the absence of the rubber covering 55 on said fittings, and said fittings are joined together quickly in the field by means of a collar 75 diametrically split into two parts and having an outer cylindrical periphery coextensive with the ouper peripheries of the ferrules 65 in the regions adjoining said collar. This collar 75 is just wide enough to fit snugly but easily between the flanges 64 of the fittings 61 and 62, when the two fittings are interfitted together to he full exen permitted, and has radially inwardly extending annular flanges 76 at its ends extending into the recesses 68 and 72 to lock the two fittings against axial separation.

Each of the parts of the collar 75 has a pair of bosses 77 on opposite sides thereof and the bosses on the two parts come together and are held together by two studs 78, threaded into two of these bosses and passing freely through the outer bosses.

The assembly may be wrapped by a thermoplastic tape 80 which is then heat-sealed firmly and conformably in place as is commonly done with steel pipes for subterranean usage.

In the constructions of FIGS. 1–4, it has been found that the gas wicks through the plies 13 and 14 of closely woven nylon fabric which is placed over the bore wire 11 near the coupling fittings of FIGS. 2, 3 and 4 described and travels down into the end construction of the hose 10, then back through the wire braids 26, 28 and 31 and subsequently under the cover 35 causing a cover blister when internal pressure is released. This is not a permeation condition which is general and overall but a wicking action bleeding gas into a pocket, so that permeation is not fast enough to accommodate the quantity of gas wicked. To overcome this condition, the nylon fabric plies 13 and 14 are desirably terminated short of the fitting of the coupling and the rubber from the covering 35 is extended transversely across the end of the plies 13 and 14 to seal the corresponding end of the hose, so that wicking is stopped at that point.

Figure 5:
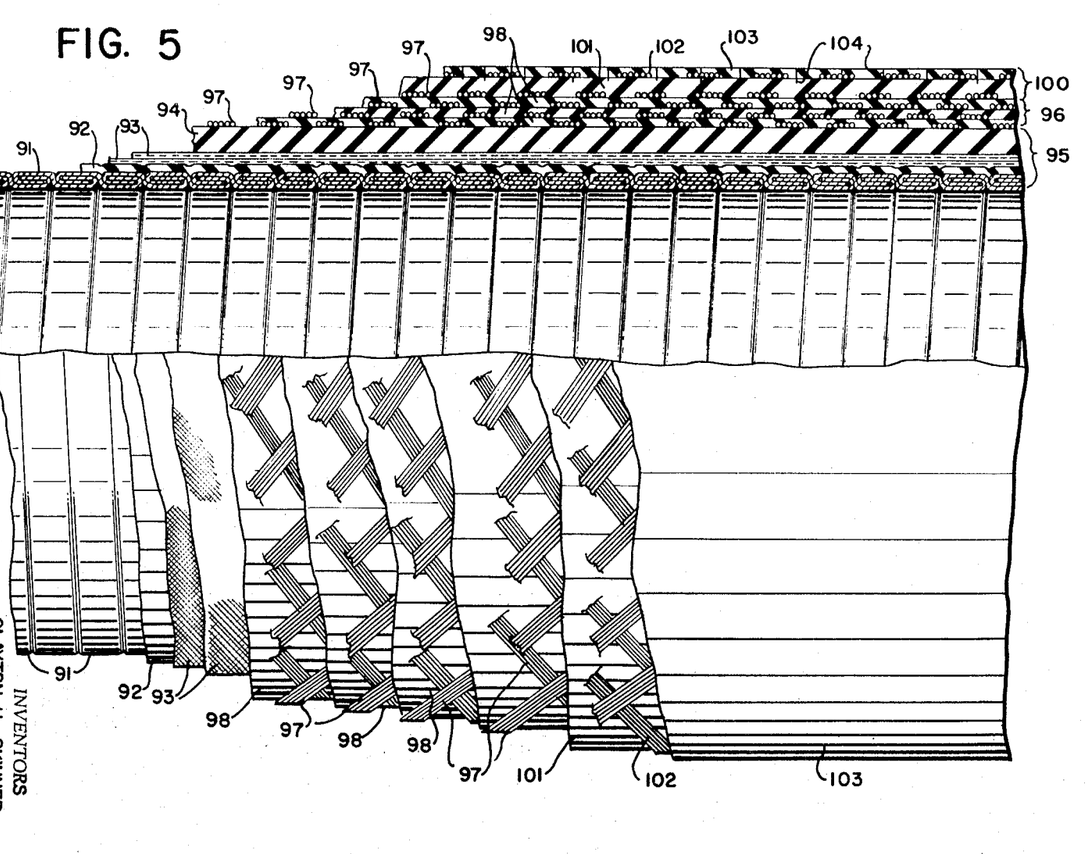
FIG. 5 is a view partly in radial section and partly in side elevation of a hose of the flexible bore tube type embodying the present invention.
Figure 5A:
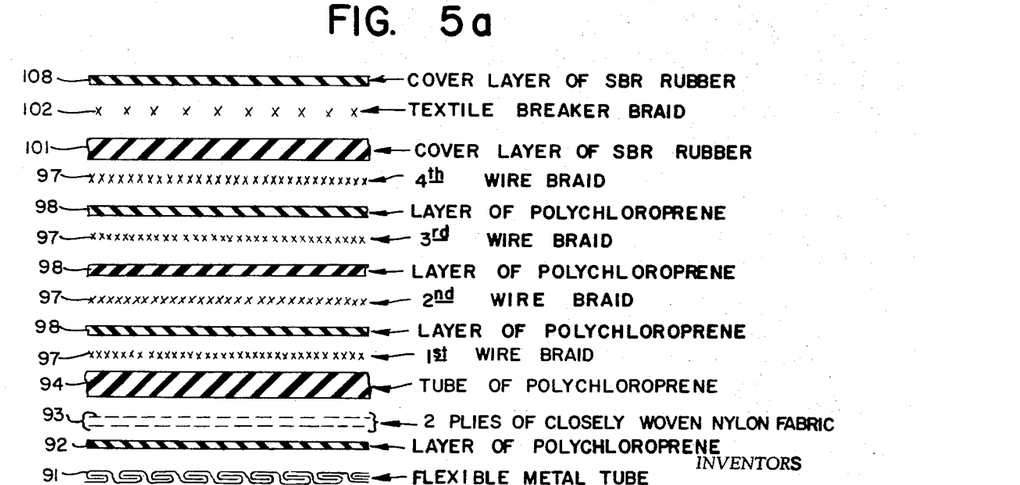
FIG. 5a is a simplified diagram showing schematically the manner and order in which the different components of the hose shown in FIG. 5 are laid in its manufacture.

FIGS. 5 and 5a show a modified form of hose construction 90 designed to meet long length requirements. The length of hose that can be manufactured following the design shown in FIG. 5 is infinite, but lengths of about 1000 feet would be practical for shipping and handling, as well as laying after manufacture.

In order to manufacture a hose meeting the requirements of long lengths, it was found desirable to so construct it as to avoid the necesity of using a mandrel, while at the same time providing an internal support for the building of the hose. For that purpose, the hose 90 has a flexible metal peripheral bore support 91 shown in the form of a flexible bore tube, which is desirably of stainless steel, but which can be constructed from other suitable metals having a composition, or so coated or treated as to render it resistant to the materials to be transported by the hose. The tube 91, which is known, per se, and which is commercially available, is shown comprising a helical ribbon of steel having its convolutions interlocked, swaged or pressed together into a flexible tubular unit or if desired, a number of interleaved helixes of ribbon may be so interlocked, swaged and pressed into a flexible tubular unit. The flexible sheet tube 91 serves as a mandrel during manufacture and is built into the hose to form an inseparable part of the hose. The flexible steel tube 91 also provides the necessary crush resistance, this permitting the elimination of the round wire 23 employed in the hose construction of FIGS. 1 and 1a.

Over the flexible metal tubing 91 is wrapped a layer 92 of rubber compound, desirably polychloroprene, and over this layer of rubber are two plies 93 of closely woven nylon fabric, each rubber frictioned on both sides. Surrounding these fabric plies 93 is a rubber tube 94, desirably of polychloroprene, to complete the tube part 95 of the hose.

The carcass 96 of the hose 90 consists of multiple reinforcing wire braids 97, four being shown, similar to the wire braids 26, 28 and 30 in the hose construction of FIGS. 1 and 1a and separated by intervening layers 98 of rubber compound, desirably polychloroprene.

Over the carcass 96 is a cover 100, comprising a layer 101 of suitable rubber, such as SBR rubber, a textile breaker braid 102 of nylon over said layer 101 and an outside layer 103 of suitable rubber, such as SBR rubber. The outer cover layer 103 is about half the thickness of the inside cover layer 101, so that the textile breaker braid 102 is not embedded approximately half-way between the outer and inner peripheries of the cover 100, as in the hose construction of FIGS. 1 and 1a. This cover 100 is, however, pricked with needles to approximately half-way through the cover to form vent punctures 104 extending through the breaker braid 102.

The three sections 95, 96 and 100 of the hose have progressively increasing permeability, the tube section 95 being least permeable, the carcass 96 having greater permeability and the cover 100 having the most permeability, as in the hose construction of FIGS. 1 and 1a.

The flexible metal interlock of the bore tube 91 renders the tube porous, permitting approximately the same degree of permeation of gas as would occur with the rough bore hose construction of FIGS. 1 and 1a, and provides a bore supporting structure performing all the functions of the bore wire 11 in the construction of FIGS. 1 and 1a.

The hose 90 of FIGS. 5 and 5a can be manufactured in long lengths and cured in standard continuous curing vulcanizers, to produce a hose which meets all the requirements listed above. In the process of curing, the different rubber layers are substantially consolidated into an integral rubber unit in which the reinforcing members described are embedded.

Because of the necessity for limiting the hose 90 to a length which will permit convenient handling, shipping and laying, the hose is manufactured to a length of about 1000 feet. These individual lengths must then be coupled in the field and for that purpose, there is provided a new and improved quick connect coupling 110 shown in FIGS. 6 and 7. In connection with this coupling, the hose 90 aside from the flexible bore tube 91, is shown for the sake of simplicity of solid rubber construction, without the other reinforcing components of the hose 90 described. However, it must be understood, that the hose 90 to which the coupling 110 is applied would be that shown in FIGS. 5 and 5a.

Figure 6:
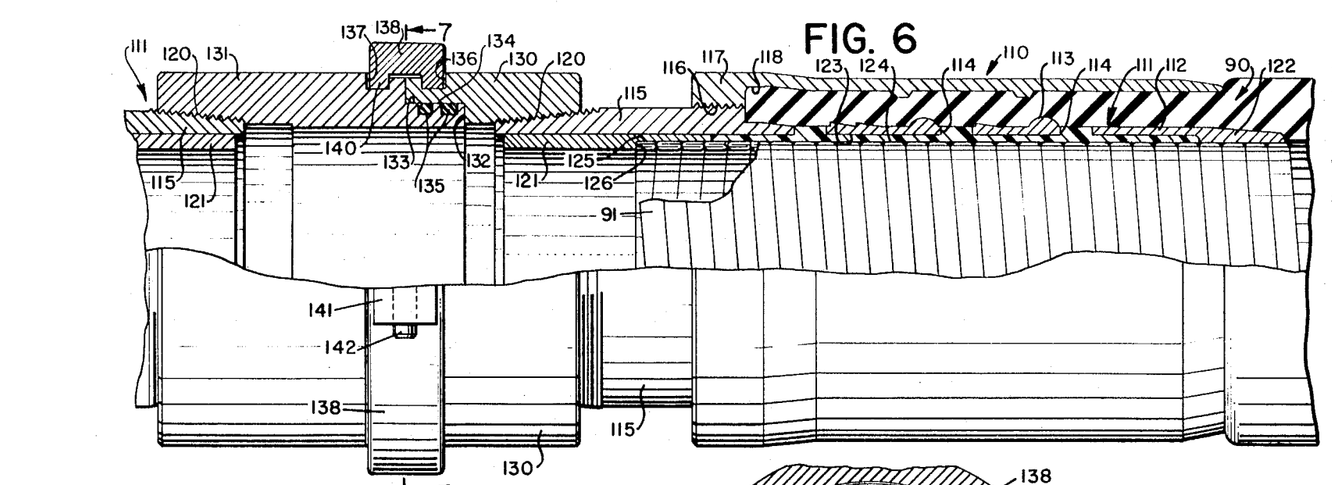
FIG. 6 is a radial section of the coupling which is employed for connecting the individual lengths of hose of the flexible bore tube shown in FIG. 5 and which constitutes another embodiment of the present invention.
Figure 7:
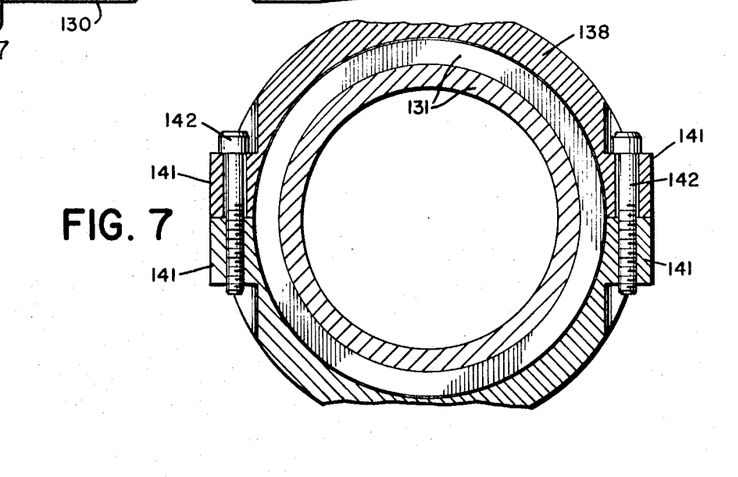
FIG. 7 is a section of the coupling taken on lines 7—7 of FIG. 6.

The coupling 110 comprises two similar fittings 111, inseparably attached at the plant to the ends of the hose 90 to be connected together in a manner to be described. Each fitting 111 comprises a tubular shank 112, having an irregular periphery 113 to promote adherence of the hose 90 thereto and having a series of holes 114 to afford adequate adherence of the bore component to this shank, as will be more fully described. Projecting inwardly of the shank 112 is a tubular extension 115 having an internal diameter coextensive with that of the shank and having a thickness greater than that of the shank. The outer end of this extension 115 has an external thread 116 to which is screwed a ferrule 117 forming with the shank 112 an annular chamber 118 for the reception therein of the hose 90, aside from its flexible bore tube 91, and the inner end of this extension 115 has an external thread 120.

Secured to the inside of the tubular extension 115, as for example, by welding, is a tubular lining 121 and the outer end of the shank 112 is enlarged in thickness to define a dam 122, which in conjunction with the end of said lining and the inner periphery of the main body of the shank forms an annular recess 123 for the reception of adhesive 124 to be described more fully. The lining 121 has a peripheral internal recess 125 for the bore tube 91 forming a limiting axially facing annular shoulder 126 for the end of said tube.

For quick coupling the two fittings 111 together in the field, there is provided a female coupling sleeve 130 screwed onto the thread 120 of the tubular extension 115 on one of said fittings, and a male coupling sleeve 131 screwed onto the thread 120 of the tubular extension 115 on the other fitting. The female coupling sleeve 130 has an internal annular recess 132 and the male coupling sleeve 131 has an external annular recess 133, these recesses being designed to permit the two coupling sleeves to conformably interfit when brought together with a stepped juncture 134 inbetween. O-rings 135 between these coupling sleeves 130 and 131 in this juncture 134 positively seal the juncture against leakage.

The internal and external diameters of the coupling sleeves 130 and 131, when brought together, are substantially the same, so that the internal and external peripheries of these sleeves are substantially cylindrically coextensive, and these sleeves have external annular recesses 136 and 137 respectively. A collar 138 locks the two coupling sleeves 130 and 131 together against axial separation. For that purpose, the collar 138 is of diametrically split construction and has radially inwardly extending flanges 140 at its ends projecting into the sleeve recesses 136 and 137 respectively in locked interfitted position of the coupling sleeves 130 and 131. The collar 138 is similar to the collar 75 in the construction of FIGS. 3 and 4 and is similarly provided with bosses 141 secured together by studs 142.

The operation of assembling the coupling 110 is as follows:

At the plant, the end of the flexible metal bore tube 91 of each length of hose 90 of about 1000 feet is passed through the shank 112 of a fitting 111, while the ferrule 117 is off the fitting, until the tube abuts the shoulder 126 of the lining 121. The bore tube 91 is then welded onto the lining 121 at the abutting end of said tube. In the set position of the bore tube 91 described, the dam 122, the shank 112, the outer end of the lining 121 and the outer periphery of the bore tube forms an annular chamber inclusive of the recess 123, which is filled with an adhesive 124, desirably an epoxy resin, as for example, one available under the same Hysol, through the filler holes 114. The rest of the hose is then built over the shank 112 in the manner described in connection with FIGS. 5 and 5a. After the hose has been completed over the shank 112 and the hose is cured, the ferrule 117 is screwed onto the threads 116 and the ferrule and the shank are swaged over the hose at prescribed pressures to assure the end pull resistance characteristics necessary to meet requirements.

The assembly described can then be coupled to another similar assembly in the field through the coupling sleeves 130 and 131 and the locking collar 138. After coupling, the entire coupled assembly can be covered with a thermoplastic tape, which is then heat-sealed onto the assembly to form a conforming protective covering, as in the construction of FIGS. 3 and 4.

While the invention has been described with particular reference to specific embodiments, it is to be understood that it is not to be limited thereto but is to be construed broadly and restricted solely by the scope of the appended claims.

What is claimed is:

1. A flexible hose comprising a plurality of concentric annular sections in embracing relationship made up of reinforcing superposed annular layers of elastomeric material consolidated into a unit, said hose being gas permeable, the gas permeability of these sections increasing progressively from section to section radially outwardly.

2. A flexible hose as described in claim 1, said hose having a flexible peripheral bore support.

3. A flexible hose as described in claim 2, said hose having one or more plies of textile woven fabric around said bore support.

4. A flexible hose as described in claim 1, said hose having a flexible metal peripheral bore support, one or more plies of woven textile fabric laid around said support, and a plurality of concentric reinforcing braids around said plies of fabric separated by layers of elastomeric material.

5. A flexible hose as described in claim 4, said hose having an outer cover, comprising an annular layer of elastomeric material, and an annular textile breaker braid embedded in the latter layer and spaced between the inner and outer peripheries of the latter layer, the latter layer being punctured substantially radially at spaced sections thereof around its periphery from the outer perihpery of the latter layer to a region spaced radially outwardly from the inner periphery of the latter layer.

6. A flexible hose as described in claim 2, said metal bore support constituting a spiral bore wire having spaced convolutions and having a rectangular cross-section with one of its flat sides facing the bore of the hose, said hose also comprising a layer of elastomeric material laid directly on and covering said wire.

7. A flexible hose as described in claim 2, said metal bore support constituting a spiral bore wire having spaced convolutions, said hose also comprising a layer of elastomeric material laid directly on and covering said wire, one or more plies of woven textile fabric laid directly on and around said covered wire, and a wire spirally wound around said plies of woven fabric embedded in elastomeric material.

8. A flexible hose as described in claim 7, said bore wire being of rectangular cross-section with one of its flat sides facing the bore of the hose, the wire around the plies of woven fabric being round and being pitched, so that its convolutions will be located opposite the spaces between the convolutions of the bore wire.

9. A flexible hose comprising an inner tube, an annular carcass and an annular outer cover, all in embracing concentric relationship, said hose being gas permeable, the inner tube having the least gas permeability, the carcass having greater gas permeability, and the cover having the greatest permeability, the tube comprising a spiral bore wire of rectangular cross-section with spaced convolutions and with one of its flat sides facing the bore of the hose, a layer of elastomeric material laid directly on and covering said wire, one or more plies of textile woven fabric laid directly on and around said covered wire, and a tubular layer of elastomeric material around said plies of woven fabric, said carcass comprising a round spiral wire pitched so that its convolutions will be located opposite the spaces between the convolutions of the bore wire, fillers of elastomeric material between the convolutions of said round wire, and a plurality of concentric wire braids around the round wire separated by layers of elastomeric material, and said cover comprising two layers of elastomeric material and an annular textile breaker braid therebetween, said layers and fillers of elastomeric material being consolidated into a unit.

10. A flexible hose as described in claim 2, said bore support constituting a flexible metal bore tube incorporated in the hose as part thereof and coherent enough to constitute a mandrel in the manufacture of the hose.

11. A flexible hose as described in claim 2, said bore support constituting a flexible stainless steel bore tube incorporated in the hose as part thereof and comprising one or more helixes with interlocked convolutions, said tube being coherent enough to constitute a mandrel in the manufacture of the hose.

12. A flexible hose as described in claim 2, said bore support constituting a flexible metal bore tube incorporated in the hose as part thereof and coherent enough to constitute a mandrel in the manufacture of the hose, one or more plies of woven textile fabric laid around said bore tube, and a plurality of concentric reinforcing wire braids around said plies of fabric separated by layers of elastomeric material.

13. A flexible permeable hose as described in claim 1, said hose having an outer cover, comprising an annular layer of elastomeric material, and an annular textile breaker braid embedded in the latter layer and spaced between the inner and outer peripheries of the latter layer, the latter layer being punctured substantially radially at spaced sections thereof around its periphery from the outer periphery of the latter layer to a region spaced radially outwardly from the inner periphery of the latter layer.

14. A flexible hose comprising an inner tube, an annular carcass and an anular outer cover in embracing concentric relationship, said hose being gas permeable, the inner tube having the least gas permeability, the carcass having greater gas permeability, and the cover having the greater permeability, the tube comprising a flexible metal peripheral bore support in the form of a tube incorporated in the hose as part thereof and coherent enough to constitute a mandrel in the manufacture of the hose, one or more plies of textile woven fabric laid directly on and around said bore support, and a tubular layer of elastomeric material around said plies of woven fabric, said carcass comprising a plurality of concentric wire braids around the latter tubular layer separated by layers of elastomeric material, and said cover comprising two layers of elastomeric material and an annular textile breaker braid therebetween, said layers of elastomeric material being consolidated into a unit.

References Cited

UNITED STATES PATENTS

| | | | |
|---|---|---|---|
| 1,009,465 | 11/1911 | Bowers | 138—131 |
| 2,661,026 | 12/1953 | Schultess | 138—131 |
| 2,750,232 | 6/1956 | Szantay et al. | 138—118 XR |
| 2,965,151 | 12/1960 | Elliott et al. | 138—139 |
| 3,073,351 | 1/1963 | Nichols | 138—131 |
| 3,103,789 | 9/1963 | McDuff et al. | 138—118 XR |
| 2,800,145 | 7/1957 | Peierls et al. | 138—128 XR |
| 1,954,724 | 4/1934 | Collom | 138—131 XR |
| 3,318,338 | 5/1967 | Craig | 138—131 |

FOREIGN PATENTS

| | | |
|---|---|---|
| 986,342 | 3/1965 | Great Britain. |
| 1,157,039 | 11/1963 | Germany. |

LAVERNE D. GEIGER, *Primary Examiner.*

BRADFORD KILE, *Assistant Examiner.*

U.S. Cl. X.R.

138—177, 131